Patented Oct. 28, 1952

2,615,920

UNITED STATES PATENT OFFICE 2,615,920

CONVERSION OF NITROAMINES TO LOWER AMINES

Carl T. Bahner, Jefferson City, Tenn.

No Drawing. Application September 11, 1947,
Serial No. 773,528

8 Claims. (Cl. 260—583)

This invention relates to a new and useful process for producing nitroamines. More particularly, it relates to the production of such amines having the general formula $$R^1-NH-R^2$$

where $R^1$ is hydrogen, alkyl, or nitroalkyl and $R^2$ has the structure

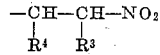

in which $R^3$ and $R^4$ are alkyl or hydrogen.

As examples of nitroamines coming within the scope of the above formula there may be mentioned the following: 1-nitromethylpropylamine, N-(2-nitrobutyl)-n-butylamine, 1-nitromethylbutylamine, 1-amino-2-nitropropane, 2-nitroisopropylamine, and N-(2-nitroethyl)ethylamine.

It is known that nitroamines can be produced by a variety of methods. For example, an amine will add to a nitroolefin to produce the corresponding nitroalkyl amine. It has also been found that primary and secondary nitroparaffins will react with N-(hydroxymethyl)alkylamines to give nitroalkyl amines. Nitroamines may also be prepared by reacting formaldehyde with a primary or secondary amine to form the corresponding N-hydroxymethylamine, which is in turn reacted with an equimolecular amount of a secondary nitroparaffin. In spite of this variety of methods, some nitroalkyl amines are not readily available. For this reason, a new method was sought for the preparation of these rare amines. The results of this study are disclosed in the following invention:

My new process for preparing amines is essentially a degradation of a higher nitroalkyl amine salt. For example, I have found that tertiary amine salts can be caused to decompose and yield secondary amine salts, and secondary amine salts will yield primary amine salts. The probable course of the reaction involved in my new process is:

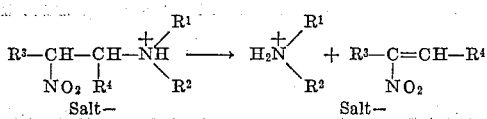

where $R^1$ is hydrogen, alkyl, nitroalkyl and $R^2$ has the structure

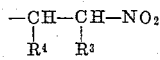

in which $R^3$ and $R^4$ are alkyl or hydrogen. The nitroolefins produced in the reaction have numerous uses and are recovered readily from the reaction mixture, by distillation or other means.

While it has been known for a long time that certain types of higher amine salts could be pyrolyzed to produce lower amine salts, the reaction was not exceptionally useful for a variety of reasons. Chief among the disadvantages of this reaction was the unusually high temperatures required; for example, it was necessary to heat trimethylamine hydrochloride to 285° C. in order to obtain dimethylamine hydrochloride. This procedure has not previously been regarded as applicable to compounds containing the nitro group because of the marked tendency of the latter to decompose, particularly when heated. It is well known also that HCl attacks the primary and secondary groups. In view of these facts, therefore, it was surprising to discover that nitroamines could be converted into lower alkylamines by the reaction of the present case.

Contrary to what has been reported by previous investigators, I have discovered that amine salts, and specifically nitroamine salts, can be readily and economically converted to lower amine salts, which may be substituted with the nitro group. Actually, the product of my new process is a salt of an amine, but the preparation of the free amine from the salt is obvious to those skilled in the art.

The starting material of my process is a salt of a higher secondary or tertiary nitroamine in which at least two of the radicals attached to the amino nitrogen atom must be substituted with nitro. The amine salt may be obtained from the free amine by a variety of methods; as, for example, by bubbling hydrogen halide gases through a substantially dry ethereal solution of the amine; or the salt may be obtained by treatment of the free amine with an alcoholic solution of picric acid; or the amine may be mixed with an aqueous solution of an acid and the salt separated by filtration. The salts of the amines which have been found useful in my process include the following: hydrochlorides, hydrobromides, sulfates, phosphates and picrates.

The process can be carried out on the dry salt; merely heating the latter to the decomposition temperature of the higher nitroamine salt. However, I prefer to carry out the process in the presence of solvents. Such solvents should have the ability to dissolve the amine salts, especially at temperatures above that of the room. While butanol appears to be the ideal solvent, any of the lower aliphatic alcohols, or mixtures thereof, are satisfactory solvents for my process. I prefer, therefore, to carry out my process by heating a higher nitroamine salt in an alcoholic solution to a temperature of about 100° for a short period of time, separating the resulting lower amine salt, and obtaining the free amine therefrom.

I may satisfactorily operate my process at temperatures ranging from 20° to 120° C., temperatures in the lower range being required for some nitroamine salts which are so unstable they decompose at room temperature. However, for most purposes, I prefer to use a temperature of about 100° C.

The reaction time may vary from only a few minutes to approximately one hour, depending upon the stability of the amine salt being treated.

The product of my new process being an amine salt which is usually quite soluble in the warm alcohol, it can be removed from the latter by precipitating the salt by the addition of substantially dry isopropyl ether, or the alcohol may be removed from the salt by vacuum distillation. In either case, the free amine may be obtained from the resulting amine salt by well-known methods. The free amine may then be purified by vacuum distillation or by recrystallization from a suitable solvent, depending upon the properties of the particular amine being recovered.

The amine salts which may be used in my new process can be obtained by conversion of the free amine to the salt by the methods listed above. The free amines which are useful as starting materials in my process may be obtained by a variety of methods. Nitroamines may also be prepared by adding an amine to a nitroolefin. Examples of amines prepared by these methods and useful in my process include the following: N,N-bis-(2 - nitrobutyl)cyclohexylamine, bis(1 - nitromethylpropyl)amine, N,N-bis(2-nitrobutyl)-n - butylamine, bis(1 - nitromethylbutyl)amine, tris-2-nitrobutylamine, N,N-bis(2-nitropropyl)-ethylamine, bis(2-nitropropyl)amine, or N,N-bis(2-nitroethyl)ethylamine.

The examples which follow are illustrative of the process by which lower amines can be obtained from higher nitroamines according to the terms of my invention. However, it is specifically understood that such examples in no way limit the scope of my invention with respect to the process demonstrated herein, since I have found the reaction to be quite general.

*Example I*

The hydrochloride of bis(1-ethyl-2-nitroethyl)amine was prepared by passing dry hydrogen chloride into a solution of 5 grams of the amine in 20 milliliters of dry isopropyl ether. The solid salt was suspended in butanol and warmed to about 100° C. for a few minutes, during which time the amine hydrochloride dissolved to a great extent. During the heating the lachrymatory odor of 1-nitro-1-butene appeared. After cooling the butanol solution and filtering off a small amount of unchanged salt the addition of dry isopropyl ether to the cooled butanol solution caused the new amine hydrochloride to be precipitated. The new compound proved to be the hydrochloride of 1-nitro-2-aminobutane. Calculated for $C_4H_{11}N_2O_2Cl$: Cl, 22.96; Found, Cl, 22.44. Yield was about 40%.

*Example II*

N,N-Bis(2-nitrobutyl)-n-butylamine hydrochloride was prepared in the manner described in Example I from the free amine. Heating the hydrochloride of the product so obtained to 100° for five minutes in butanol solution caused a pyrolysis of the original material. The mixture was worked up as in Example I. The product of this reaction was the hydrochloride of N-(2-nitrobutyl)-n-butylamine. The analysis for this compound was: Calculated for $C_8H_{19}N_2O_2Cl$, 16.8; found, Cl, 17.3.

*Example III*

An 8.4 g. portion of crude bis(1-propyl-2-nitroethyl)amine was dissolved in 20 ml. of isopropyl ether and dry hydrogen chloride gas passed into the solution at room temperature. The amorphous hydrochloride salt of the amine was separated from the ether and heated 5 minutes in butyl alcohol solution at 100° C. The lachrymatory odor of 1-nitro-1-pentene appeared and on cooling and dilution with isopropyl ether, 2.4 g. of 1-nitro-2-aminopentane hydrochloride crystals were obtained. After recrystallization these white crystals melted at 89–90° C. Composition calculated for $C_5H_{13}N_2O_2Cl$: Cl 21.02%; found, 21.18, 21.24%.

The amines of my invention are nitrosubstituted, and are in general either colorless liquids or white waxy solids. The low-molecular-weight nitroamines possess characteristic pungent odors, whereas the high-molecular-weight nitroamines are relatively odorless. The nitroamines are soluble in ether, methanol and benzene, but those of moderate and high molecular weight are insoluble in water.

The nitroamines of my invention are often inaccessible by previously known methods of preparation. The process is therefore useful in preparing intermediates for the preparation of numerous organic compounds.

Now having described my invention, what I claim is:

1. In a process for the preparation of amines of the general formula,

where $R^1$ is selected from the group consisting of hydrogen, alkyl and nitroalkyl, and $R^2$ has the structure

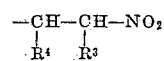

in which $R^3$ and $R^4$ are selected from the group consisting of alkyl and hydrogen, the steps which consist in heating amine salts of the formula

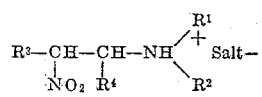

wherein the salt is that of an acid having an ionization constant at 18° C. of at least about $1.1 \times 10^{-2}$ and where $R^1$ is selected from the group consisting of hydrogen, alkyl and nitroalkyl, and $R^3$ and $R^4$ are selected from the group consisting of hydrogen and alkyl and $R^2$ has the structure

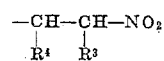

in which $R^3$ and $R^4$ are selected from the group consisting of hydrogen and alkyl; at a temperature of 20° to 120° C., isolating the lower amine salt and producing the free amine therefrom.

2. The process of claim 1 wherein the nitroamine salt is heated in the dry form to the decomposition temperature of said salt.

3. The process of claim 1 wherein the nitroamine salt is heated in an inert solvent at a temperature of 20° to 120° C.

4. The process of claim 1 wherein the nitroamine salt is heated in an alcohol solvent at a temperature of about 100° C.

5. The process of claim 1 wherein the nitroamine salt is the hydrochloride and the said nitroamine hydrochloride is heated in butanol.

6. The process of claim 1 wherein the amine salt treated is the hydrochloride of bis-(1-ethyl-2-nitroethyl)amine and the salt of the lower amine produced therefrom is the hydrochloride of 1-nitro-2-aminobutane.

7. The process of claim 1 wherein the amine salt treated is the hydrochloride of N,N-bis(2-nitrobutyl-n-butylamine and the salt of the lower amine produced therefrom is the hydrochloride of N-(2-nitrobutyl)-n-butylamine.

8. The process of claim 1 wherein the amine salt treated is the hydrochloride of bis(1-propyl-2-nitroethyl)amine and the salt of the lower amine produced therefrom is the hydrochloride of 1-nitro-2-aminopentane.

CARL T. BAHNER.

REFERENCES CITED

The following references are of record in the file of this patent:

De Mauny: "Bull. Soc. Chim.," (5), vol. 4, pp. 1460–1468 (1937).

Senkus: "J. Am. Chem. Soc.," vol. 68, pp. 10–12 (1946).

Degering: "An Outline of Organic Nitrogen Compounds," (Univ. Titho., Ypsilanti, Mich., 1945), p. 209, paragraph 616.

Egloff: "Reactions of Pure Hydrocarbons," (Reinhold Pub. Co., N. Y., 1937), pp. 28–29.

Shelley: Doctoral dissertation presented by T. H. Shelley, Jr., to the Graduate Faculty of Cornell University in June 1947.